United States Patent [19]
Hayashi et al.

[11] Patent Number: 5,585,015
[45] Date of Patent: Dec. 17, 1996

[54] LASER MACHINING APPARATUS AND METHOD

[75] Inventors: Eikichi Hayashi; Mitsunobu Oshimura; Tsukasa Matsuno; Hidekazu Sawai, all of Nagoya, Japan

[73] Assignee: Mitsubishi Denki Kabushiki Kaisha, Tokyo, Japan

[21] Appl. No.: 362,192

[22] Filed: Dec. 22, 1994

[30] Foreign Application Priority Data

Dec. 28, 1993 [JP] Japan ................. 5-337753

[51] Int. Cl.⁶ .................................................. B23K 26/16
[52] U.S. Cl. .................. 219/121.67; 219/121.72; 219/121.82
[58] Field of Search ............... 219/121.6, 121.67, 219/121.72, 121.82, 121.84, 121.85; 83/101, 98, 112, 167; 198/496, 498, 517, 512, 506

[56] References Cited

U.S. PATENT DOCUMENTS

| | | | |
|---|---|---|---|
| 2,964,126 | 12/1960 | Peterson | 198/498 |
| 3,626,561 | 12/1971 | Luce et al. | 83/101 |
| 4,122,736 | 10/1978 | Price et al. | 83/101 |
| 4,950,861 | 8/1990 | Erlenmaier et al. | 219/121.67 |
| 5,049,723 | 9/1991 | Macdonald | 219/121.67 |
| 5,373,136 | 12/1994 | Ernst et al. | 219/121.67 |

FOREIGN PATENT DOCUMENTS

| | | | |
|---|---|---|---|
| 3990828 | 8/1990 | Germany . | |
| 57-159267 | 10/1982 | Japan . | |
| 59-94595 | 5/1984 | Japan | 219/121.72 |
| 59-127987 | 7/1984 | Japan | 219/121.72 |
| 61-189896 | 8/1986 | Japan . | |
| 63-2594 | 1/1988 | Japan . | |
| 63-52789 | 3/1988 | Japan | 219/121.72 |
| 216291 | 2/1990 | Japan . | |
| 2262939 | 10/1990 | Japan . | |
| 428711 | 7/1992 | Japan . | |
| 58065 | 1/1993 | Japan . | |

Primary Examiner—Teresa J. Walberg
Assistant Examiner—Gregory L. Mills
Attorney, Agent, or Firm—Sughrue, Mion, Zinn, Macpeak & Seas

[57] ABSTRACT

In a laser machining apparatus and method according to the present invention, a chip conveyor provided under the machining head parallel to the moving direction of the machining head recovers chips dropping near a movable area of a machining head, the chip tray provided in a section where the chip conveyor does not exit, receives chips dropping in a movable area of the machining table where the chip conveyor does not exist, and brushes provided under the machining table move along with the machining table to clean off chips stored in the chip trays and drop the chips onto the chip conveyor.

11 Claims, 6 Drawing Sheets

PRIOR ART

FIG. 11

PRIOR ART

FIG. 12

PRIOR ART

LASER MACHINING APPARATUS AND METHOD

FIELD OF THE INVENTION

This invention relates to a laser machining apparatus and method, and more particularly to a laser machining apparatus having a mechanism to carry chips that result when workpieces subjected to laser machining drop from the machining position.

BACKGROUND OF THE INVENTION

An apparatus based on the conventional technology is disclosed in "workpieces discharging apparatus for a laser machining apparatus" and in Japanese Utility Model Publication No. 28711/1992. A laser machining apparatus based on the conventional technology may be seen with reference to the front view shown in FIG. 10, the top view shown in FIG. 11, and the side view shown in FIG. 12.

In each of the figures above, the reference numeral 1 indicates a machining table on which a workpiece 2 is mounted and supported by a support pin 3. The table 1 moves from side to side in FIG. 10 and FIG. 11. A machining head 4 moves perpendicularly to the moving direction of the machining table 1, above the machining table 1 and the workpiece 2, and irradiates a laser beam onto the workpiece 2. A guiding unit and a driving unit for the machining table 1 and the machining head 4 are not shown in the figures, but it is assumed that the machining table 1 moves in the X direction and the machining head 4 moves in the Y direction, and when assembled with a control unit not shown herein, it is possible to freely machine the workpiece 2 with a laser beam within the X–Y plane.

Figure 10:
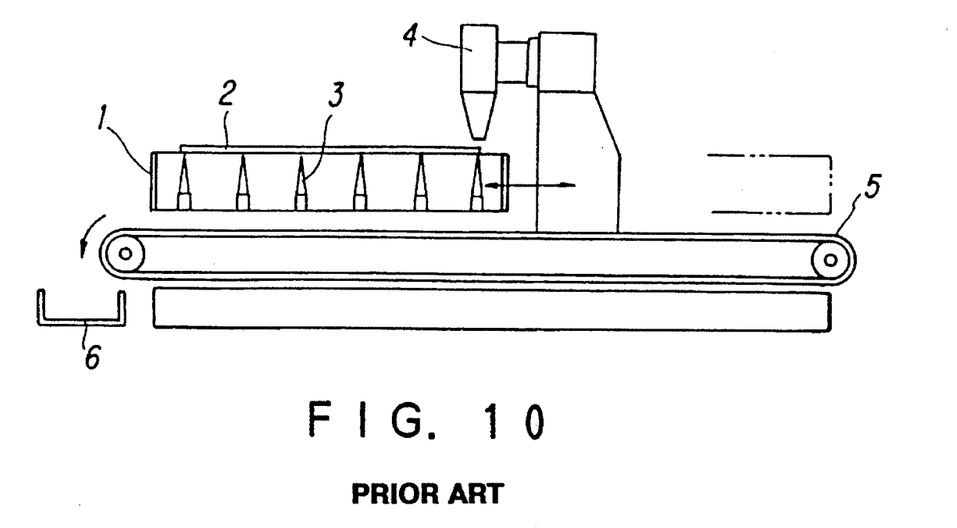
FIG. 10 is a front view illustrating construction of a conventional type of laser machining apparatus.
Figure 11:
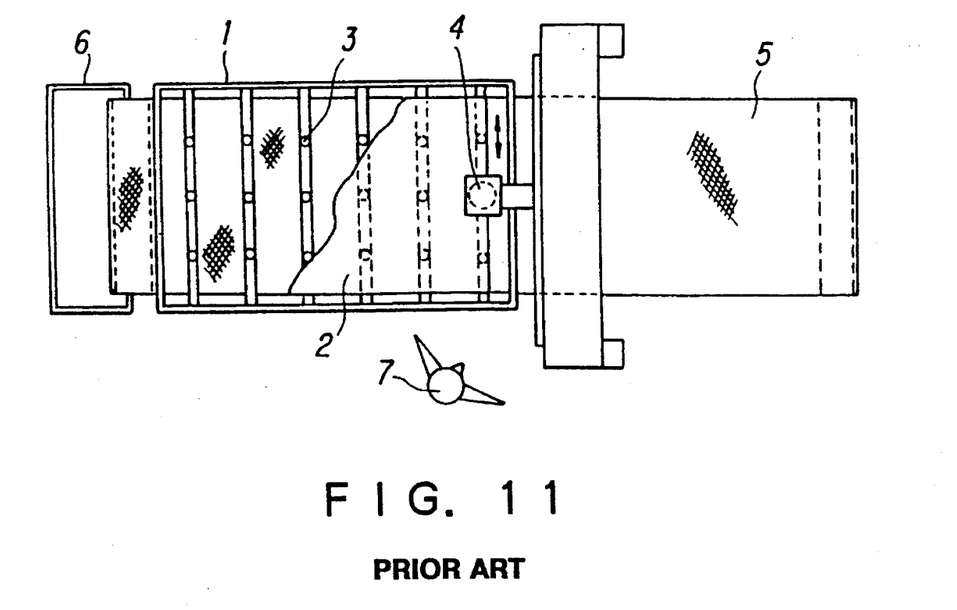
FIG. 11 is a top view illustrating construction of a conventional type of laser machining apparatus.
Figure 12:
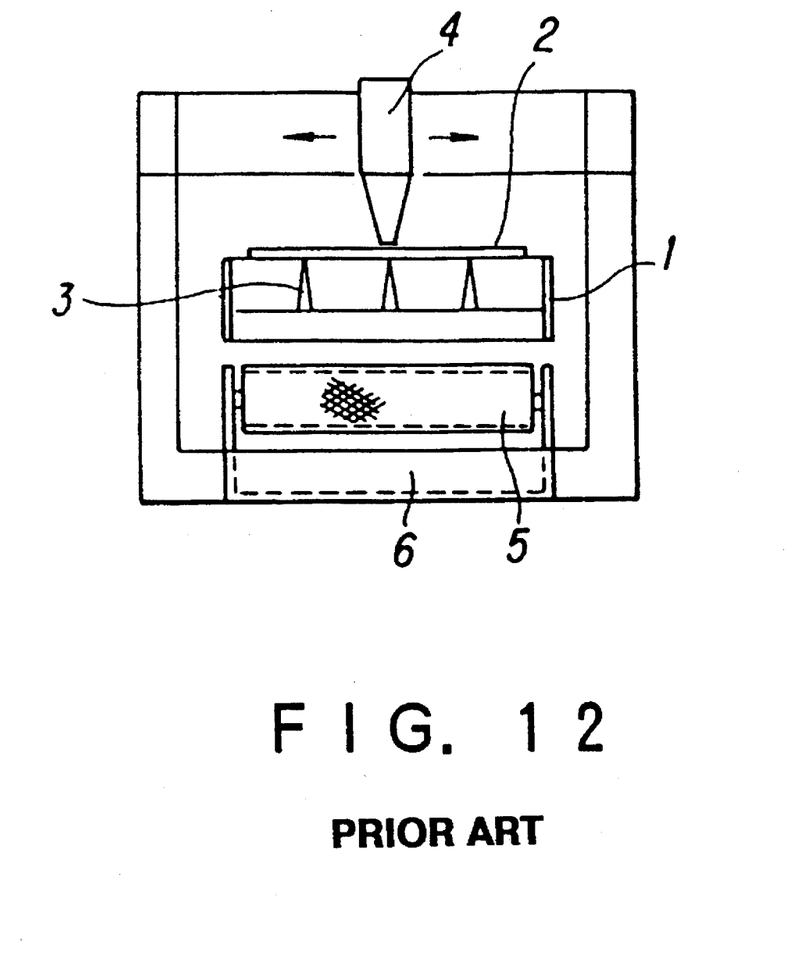
FIG. 12 is a side view illustrating a conventional type of laser machining apparatus.

In this laser machining for cutting, the workpiece 2 is supported by the support pins 3 each having a needle-like tip so that a laser beam from the machining head 4 reaches positions located under the workpiece 2. For this reason, on the machining table 1 a space is provided so that workpieces, machined pieces (called chips hereinafter), and products can drop therethrough to a position under the machining table 1.

A chip conveyor 5 is provided under the machining table 1 in the entire fixed section over which the machining table can move. Thus, chips dropping after the workpiece is subjected to laser machining via the dropping space to below the machining table are received and carried out of the machining table movable area. The reference numeral 6 is a recovery box, in which chips carried by the chip conveyor 5 are collected.

In the conventional type of apparatus as described above, an area within the X-Y plane where laser machining is executed is limited to an area where the machining head 4 moves. Unless chips are substantially large (when chips are large, the chips do not drop because of interference by the support pins 3), when machining under ordinary conditions, chips drop in a zone having a specified width within the area where the machining head 4 moves. However, sometimes chips will hang on the support pins 3 on the machining table 1 or on some other structure on the machining table 1. As a result, the chips may drop onto an area other than that described above, namely in the entire area where the machining table 1 moves, so that the above-described chip conveyor 5 must be provided in the entire area where the machining table 1 moves to collect all chips without fail and irrespective of the machining sequence. It should be noted that the reference numeral 7 indicates an operator, and the normal operation of a laser machining apparatus is carried out at the place shown in this figure.

Technical documents relating to this include Japanese Patent Laid-Open Publication No. 262939/1990 disclosing the "parts take-out device", Japanese Utility Model Laid-Open Publication No. 2594/1988 disclosing the "chips discharging device for a laser machining apparatus", Japanese Patent Laid-Open Publication No. 8065/1993 disclosing the "automatic high speed cutting device for lengthy rod-like material", Japanese Utility Model Laid-Open Publication No. 16291-1990 disclosing the "product take-out device for a laser machining apparatus", and Japanese Patent Laid-Open Publication No. 159267/1982 disclosing the "metallic material melting/cutting device".

Laser machining apparatus based on the conventional technology, having the configuration as described above, has the following problems:

1) Firstly, it is necessary to provide a lengthy chip conveyor in the machining apparatus, which results in a high cost for the apparatus.

2) Secondly, because of the lengthy and large size of the chip conveyor, work such as removing or reassembling the chip conveyor can not be carried out easily, maintenance of the chip conveyor is very difficult, and workability is very poor.

3) Thirdly, the operator must go to the front side of the machining apparatus to remove chips, which results in low operability of the apparatus.

Also, the size of this type of laser machining apparatus may be from 4 m (length)×5 m (width) up to max. 5 m (length)×9 m (width) also. For this reason, also a chip conveyor for this kind of large system can be very large.

SUMMARY OF THE INVENTION

It is an object of the present invention to provide a laser machining apparatus which does not need an expensive chip conveyor, allows for convenient maintenance, and excellent operability.

In the laser machining apparatus according to the present invention, the chip moving means is provided under the machining head parallel to the moving direction of the machining head, and recovers chips dropping in or around a movable area of the machining head. Also, the chip collecting means is provided in a section where there is no chip moving means and receives chips in a movable area of the machining table provided in the section where there is no chip moving means. Furthermore, cleaning means provided under the machining table moves under the machining table, cleaning off chips stored in the chip collecting means and dropping the chips into the chip moving means.

The laser machining apparatus according to one embodiment of the present invention has a raking-up mechanism, based on a scraper system, which collect chips as the chip moving means.

The laser machining apparatus according to another embodiment of the present invention has a sloped vibrating plate mechanism which collects chips as the chip moving means.

The laser machining apparatus according to yet another embodiment of the present invention has a drawer mechanism which collects chip as the chip moving means.

The laser machining apparatus according to the present invention has a dropping means provided under the machining table and covering the moving mechanism which drops chips into the chip collecting means provided under the machining table.

The laser machining apparatus according to the present invention has a guiding means and a driving means provided at edge sections in the moving direction of the machining table and perpendicular to the moving direction of the machining table respectively. The guiding means and the driving means insure a wide space for chips to drop therethrough in the machining table as well as in the movable area of the machining table.

As described above, with the laser machining apparatus according to the present invention, it is possible to reduce the size of the chip conveyor, keep its price low, easily maintain the chip conveyor, and recover chips at a position closer to the operator, so that a laser machining apparatus having excellent operability can be obtained.

Also, in one embodiment of the laser machining apparatus according to the present invention, the chip conveyor has a raking-up mechanism based on a scraper system, thereby permitting a cheaper laser machining apparatus which is easily maintained.

In another embodiment of the laser machining apparatus according to the present invention, the chip conveyor is formed as a sloped vibrating plate, thereby permitting a cheaper laser machining apparatus which is easily maintained.

In yet another embodiment of the laser machining apparatus according to the present invention, the chip conveyor is formed as a drawer, thereby permitting an even cheaper laser machining apparatus which is easily maintained.

Also, in the laser machining apparatus according to the present invention, a driving means for driving a machining table is provided at the center of the machining table, and a chute plate covering the driving means and causing chips to drop into the chip collecting means is provided under the machining table. Accordingly, it is possible to obtain an especially high speed, high precision laser machining apparatus with excellent operability.

Also, in the laser machining apparatus according to the present invention, a guide means for guiding movement of the machining table and a driving means for driving the machining table are provided at edge sections in the moving direction of the machining table as well as in the direction vertical to the moving direction of the machining table. Accordingly, it is possible to obtain a laser machining apparatus which is highly efficient in recovering chips and has excellent operability.

Other objects and features of this invention will become understood from the following description with reference to the accompanying drawings.

DESCRIPTION OF THE PREFERRED EMBODIMENTS

A detailed description of a laser machining apparatus according to several embodiments of the present invention will now be given with reference to the related drawings.

Figure 1:
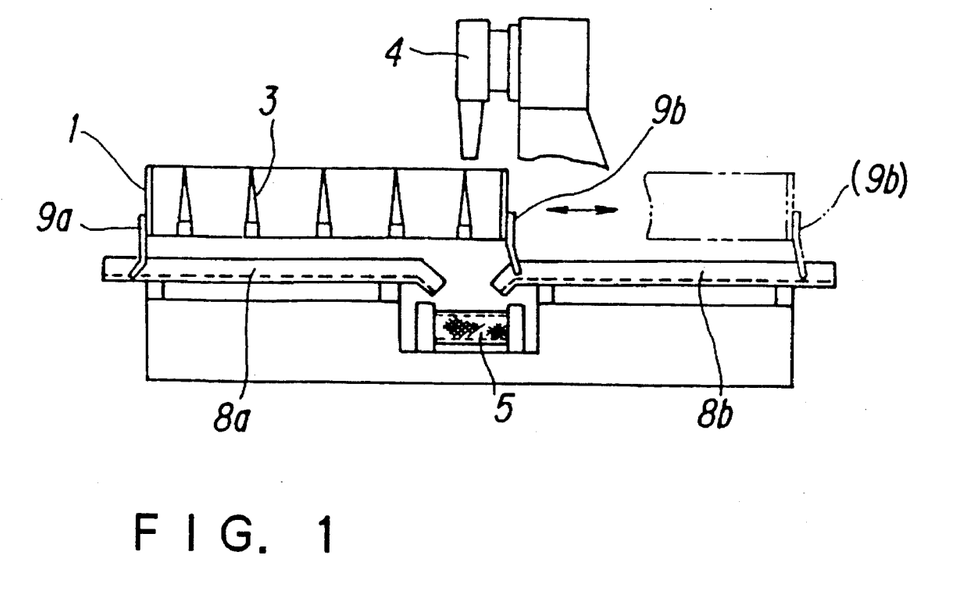
FIG. 1 is a front view illustrating construction of the laser machining apparatus according to the present invention.
Figure 2:
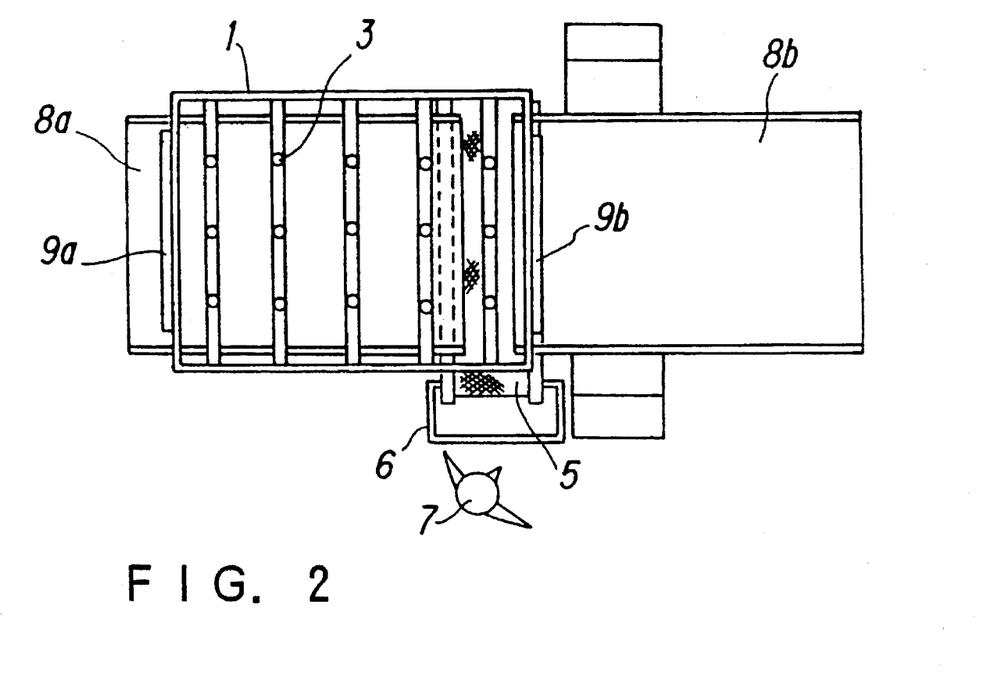
FIG. 2 is a top view illustrating construction of the laser machining apparatus according to the present invention.
Figure 3:
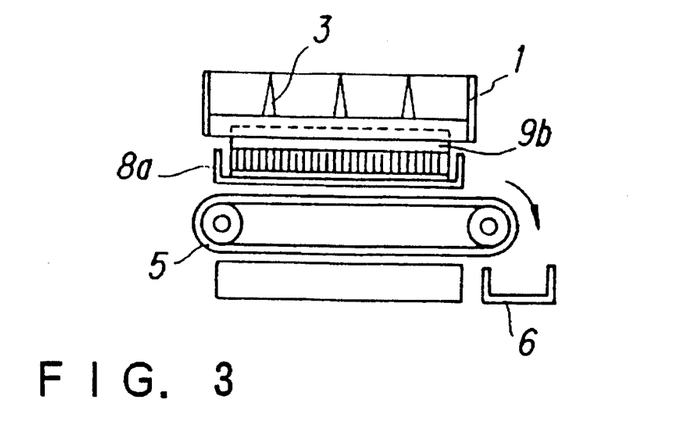
FIG. 3 is a side view illustrating construction of the laser machining apparatus according to the present invention.

FIG. 1 is a front view illustrating a laser machining apparatus according to a first preferred embodiment of the present invention, FIG. 2 is a top view thereof, and FIG. 3 is a side view thereof, and in these figures complicated sections are not shown. In these FIGS. 1 is a machining table on which a workpiece is mounted and supported by the support pins 3 and which moves in the right and left directions in FIG. 1 and FIG. 2. A machining head 4 moves in the direction that the machining table moves as well as moves perpendicularly to the moving direction of the machining table, and directs a laser beam onto the workpiece 2. Details of mechanism for laser processing is the same as that in a conventional type of machining apparatus, but an operator 7 usually operates the laser machining apparatus at the position shown in FIG. 2.

A chip conveyor 5 is provided under the movable machining head 4 in parallel to the moving direction of the machining head 4 at a fixed position under the machining table 1. The reference numerals 8a and 8b indicate a chip tray provided under a movable area of the machining table 1 in a section where there is no chip conveyor 5, and the reference numerals 9a and 9b indicate brushes provided in both edge sections of the machining table 1 in the moving direction thereof.

A chip collection box 6 is provided beside operator 7. The chip trays 8a and 8b, each having a modified ]-shaped cross section, are provided above the chip conveyor 5 and are inclined toward the chip conveyor 5 in an area close to the chip conveyor 5. Each of the brushes 9a and 9b has a hair section (wire mall also be used for this section) provided so that the hair contacts the entire bottom area of the chip trays 8a and 8b in a lateral direction.

Figure 4:
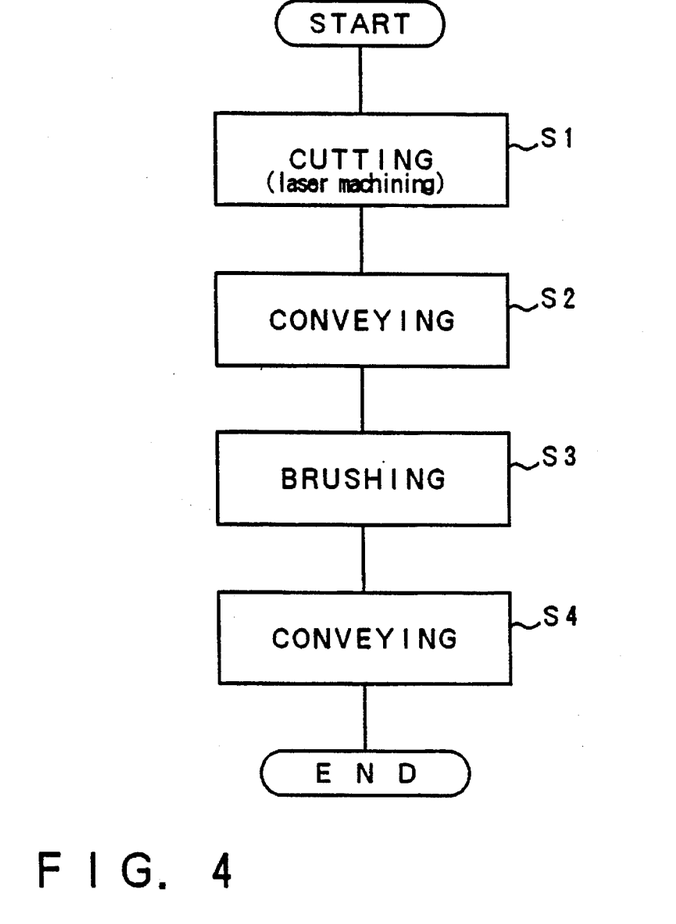
FIG. 4 is a flow chart illustrating an operation according to the present invention.

Next, the operation of the laser machining apparatus according to FIG. will be described. As described in relation to the conventional type of laser machining apparatus, when executing laser machining (S1), most chips drop in a movable area of the machining head 4 to a position under the machining table 1. Consequently, the chips are collected in the collection box 6 by the chip conveyor 5 provided under the machining head 4 parallel to the moving direction of the machining head 4 (S2).

However, sometimes chips do not drop at the laser machining position described above and may hang on structures of the machining table 1. If chips drop under the machining table in the movable area of the machining table 1 other than that described above, those chips are at first received by the chip trays 8a, 8b. Then the chips are scraped toward the chip conveyor 5 by the brushes 9a, 9b following the movement of the machining table 1 (S3). When the brushes 9a, 9b reach an edge section of the chip conveyor 5, the chips drop onto the chip conveyor 5, and the chips are collected into the collection box 6 (S4).

As described above, the brushes 9a, 9b clear the entire areas of the chip trays 8a, 8b, and chips are collected into the collection box 6. If the machining table does not move along the full stroke area thereof, all chips are not always recovered, but this is acceptable because chips rarely drop into the chip trays 8a, 8b, and the machining table 1 may be moved by, for instance, pressing the manual push button, or a prespecified machining table movement program may automatically be executed when machining ends. It is also possible to adjust the length of the chip trays 8a, 8b in the moving direction of the machining table the , width of the chip conveyor 5, the positions of the brushes 9a, 9b onto their machining table 1, and the relation to the stroke of the machining table 1 freely as needed.

Figure 5:
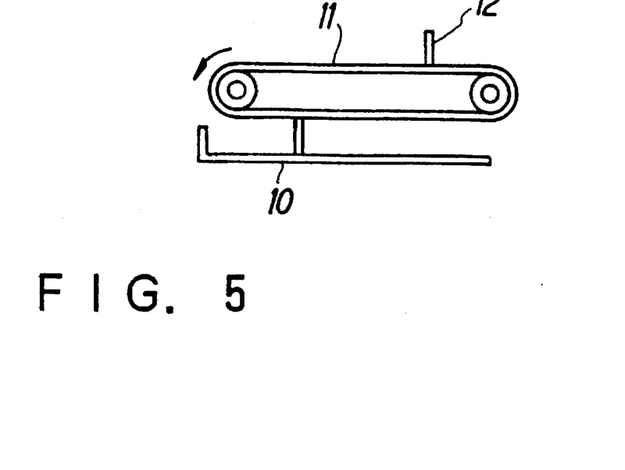
FIG. 5 is a view illustrating construction of the laser machining apparatus according to the present invention.

Next, a description of Embodiment 2 of the present invention will be given. FIG. 5 illustrates the case where the chip conveyor 5 in Embodiment 1 is formed with a raking-up mechanism based on a scraper system. In this figure, chips, which have dropped onto a bottom plate 10, are scraped by a raking-up plate 12 driven by a mechanism such as chain 11 in one direction, and are dropped from the edge section outside the apparatus.

Figure 6:
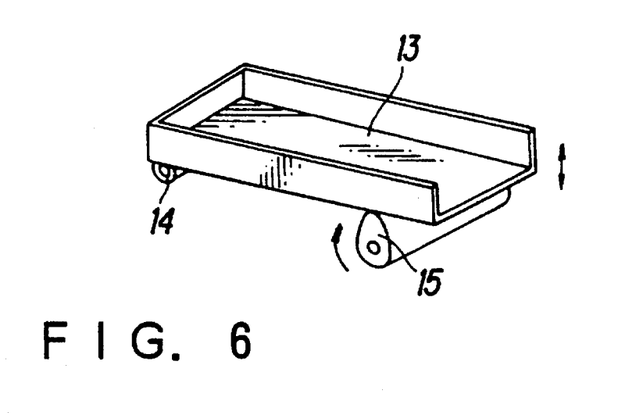
FIG. 6 is a perspective view illustrating construction of the laser machining apparatus according to the present invention.

Next, a description of Embodiment will be given 3. FIG. 6 illustrates the case where the chip conveyor 5 in Embodiment 1 comprises a sloped vibrating plate. In this figure, a sloped vibrating plate 13 has a shape box having a cutout in one side thereof, and is set in the apparatus so that the cutout side comes to a lower position when assembled in the apparatus in the sloped posture. The side of the sloped vibrating plate having no cutout section is rotatably supported by a hinge 14 as a center for rotation thereof, while an eccentric cam 15 is provided under the cutout side. The eccentric cam 15 is rotated by a driving means not shown herein, and the sloped vibrating plate 13 vibrates more in the vertical direction at a position closer to the cutout section. Because of this construction, chips which have dropped onto the sloped vibrating plate 13 gradually move toward the cutout side due to slope and vibration of the vibrating plate and drop from an edge section in the cutout side outside the apparatus.

Figure 7:
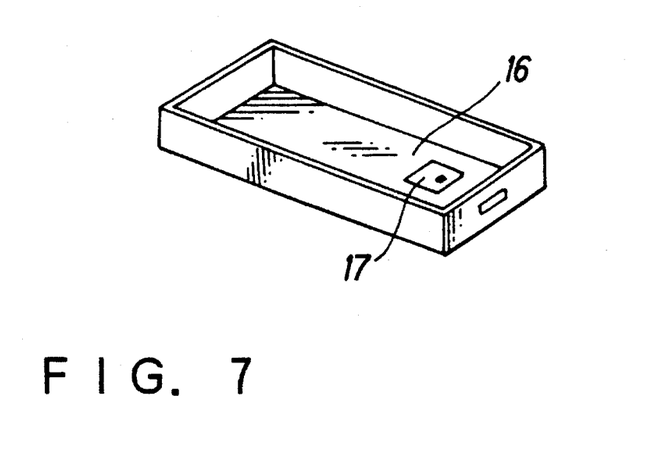
FIG. 7 is a perspective view illustrating construction of the laser machining apparatus according the present invention.

Next, a description of Embodiment 4 of the present invention will be given; FIG. 7 shows Embodiment 4 of the present invention, and is a perspective view illustrating a case where the chip conveyor 5 in Embodiment 1 has a drawer construction. In this figure, a drawer 16 is provided at an appropriate place in place of the chip conveyor 5 in FIG. 1, and chips are collected in this drawer 16. When the drawer is small, the entire drawer can be pulled off and used as the collection box 6. If the drawer 16 is large and heavy, it is possible to provide a chip dropping port in a bottom surface of the drawer and cause chips to drop from this dropping port to the collection box 6, if necessary.

Figure 8:
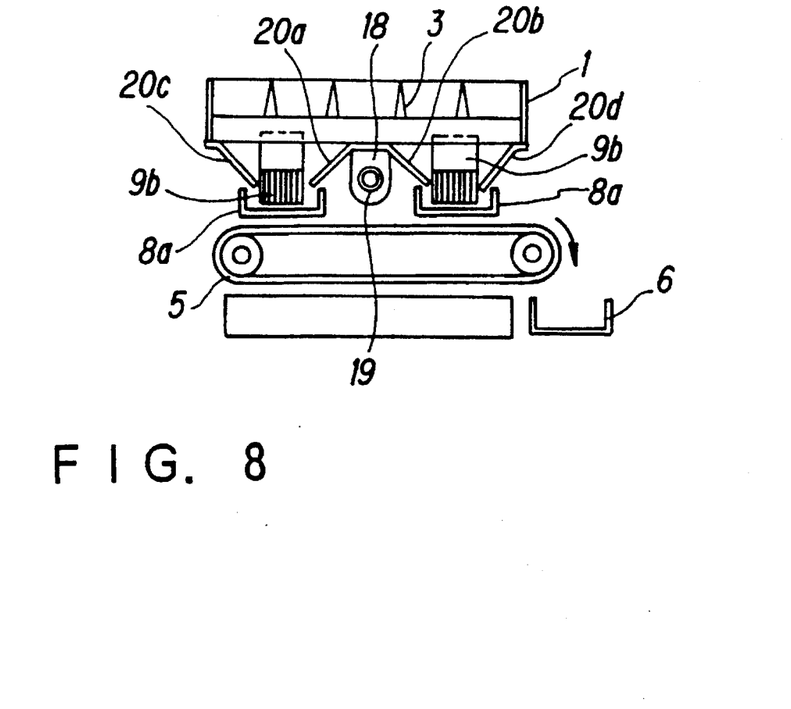
FIG. 8 is a side view illustrating the laser machining apparatus according to the present invention.

Next, a description of Embodiment 5 of the present invention will be given. FIG. 8 illustrates Embodiment 5 of the present invention. Referring to FIG. 8, it is well known that a driving mechanism for the machining table 1 should preferably be located at a position close to the machining table 1 and at the same time at the center of the machining table 1, but to carry out laser machining there is no way to provide the driving mechanism under the machining table at the center thereof. In this embodiment, the reference numeral 18 indicates a ball nut provided under the machining table 1 at the center thereof, while the reference numeral 19 indicates a ball screw, and when the ball screw 19 is rotated from the fixed side, the machining table 1 is moved.

Each of the reference numerals 20a, 20b indicate a chute plate which protects the driving mechanism such as the ball nut 18 and the ball screw 19 from chips dropping thereto, and which also causes chips to drop into the chip tray 8a under the machining table 1 without fail. In this embodiment, the width of the chip tray 8a or the brush 9b is narrow, and chute plates 20c, 20c are provided under the machining table in a section where there is no driving mechanism to reduce the cost of the apparatus. However, the construction as described above is also acceptable. In this embodiment, in contrast to Embodiment 1, the chip tray is divided to 4 portions, and brushes are mounted at 4 positions, but the same effect can be achieved.

Figure 9:
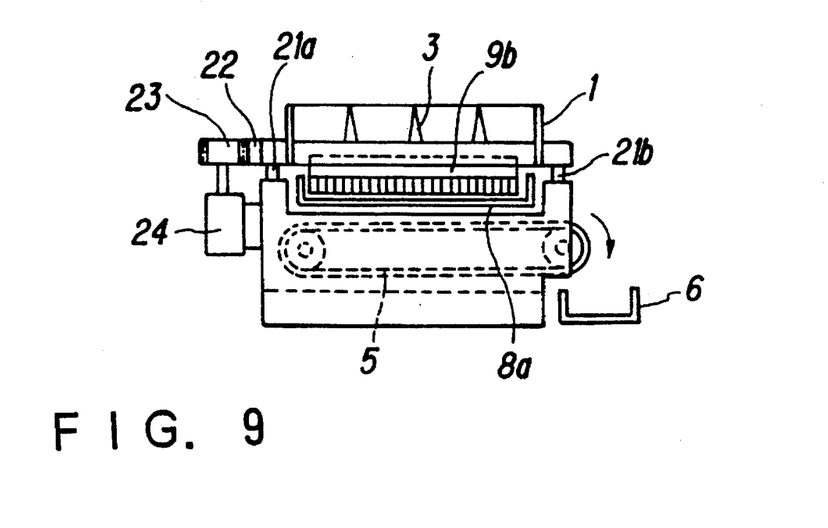
FIG. 9 is a side view illustrating construction of the laser machining apparatus according to the present invention.

Next, a description of for Embodiment 6 will be given. FIG. 9 is a side view illustrating Embodiment 6 of the present invention. In each of the embodiments described above, the main purpose is to realize a low cost, high speed and high precision driving mechanism for the machining table 1. However, as the space under the machining table 1 through which chips drop becomes narrow, the chip recovery efficiency becomes lower.

In this embodiment, the chip recovery efficiency is raised by sacrificing the high speed of performance the drive of the machining table 1, and to some degree, the level of accuracy. In this figure, the reference numerals 21a, 21b are straight guides, each working as a guide mechanism. Also in this figure, a rack 22 is on the side face of the machining table 1, and is provided parallel to the moving direction of the machining table 1. A pinion 23, and a motor 24 to rotate the pinion 23 are provided in the fixed side. The driving mechanism for the machining table 1 is formed with the rack 22, pinion 23, and motor 24.

Thus, by providing the guide mechanism for guiding movement of the machining table 1 and the driving mechanism for driving the machining table 1 at edge sections in the moving direction of the machining table 1 as well as perpendicular to the moving direction of the machining table 1 it is possible to raise the efficiency of chip recovery without making the space under the machining table 1, through which chips drop, narrower. In this embodiment the driving mechanism is based on a rack and pinion system and driving is carried out one side, but the driving mechanism may be based on a ball screw system or 2-shaft synchronous driving may be executed in both sides, although the cost becomes a little higher.

It is also possible to achieve the same effect as that in the embodiments of the present invention as described above with the following method of construction. The description of the above embodiments assumes that the machining head 4 moves perpendicular to the moving direction of the machining table 1. However, a construction in which the machining head 4 also moves up and down to machine a box-like workpiece is possible. Furthermore, if the machining head 4 is inclined or rotates, such factors as the width of the chip conveyor 5 can be changed as necessary to accommodate the structure of the machining head 4. Also, in the embodiments of the present invention described above, a workpiece 2 is supported on the machining table 1 by the support pins 3, but a knife edge-shaped construction, or a honeycomb construction, or a mesh construction. Also, the above description assumes that the brushes 9a, 9b are based on a fixed system, but the brushes may be driven to rotate. Furthermore the brushes may be provided at places other than the edge sections of the machining table for cleaning more effectively.

Although the invention has been described with respect to specific embodiments for a complete and clear disclosure, the appended claims are not to be thus limited but are to be construed as embodying all modifications and alternative constructions that may occur to one skilled in the art which fairly fall within the basic teaching set forth herein.

What is claimed is:

1. A laser machining apparatus comprising:

a machining table on which a workpiece is mounted, said machining table having a space for chips from the workpiece generated during laser machining to drop therethrough, said machining table moveable in a moving direction;

a machining head moveable in a direction perpendicular to said moving direction of said machining table for executing said laser machining on said workpiece;

a chip conveyor, communicable with a section of said machining table, for conveying a first number of said chips and a second number of said chips in a specific direction, said first number of chips dropping through said space of said machining table onto said chip conveyor;

a chip tray communicable with said chip conveyor, and communicable with a section of said machining table where said chip conveyor does not exist, for receiving said second number of said chips, said second number of said chips dropping through said space of said machining table onto said chip tray; and a cleaner for moving said second number of said chips from said chip tray to said chip conveyor.

2. A laser machining apparatus according to claim 1, wherein said chip conveyor comprises a raking plate and a drive mechanism.

3. A laser machining apparatus according to claim 1, wherein said chip conveyor is formed as a vibrating plate.

4. A laser machining apparatus according to claim 1, wherein said chip conveyor is formed as a drawer.

5. A laser machining apparatus according to claim 1, wherein said chip conveyor is provided under said machining table in parallel to said moving direction of said machining head.

6. A laser machining apparatus according to claim 1, wherein said chip conveyor conveys said chip by using a fluid.

7. A laser machining apparatus according to claim 1, wherein said chip tray is provided under a moving area of said machining area of said machining table in a said section where said chip conveyor does not exist.

8. A laser machining apparatus according to claim 1, wherein said cleaner is formed as a brush.

9. A laser machining apparatus according to claim 1, further comprising:

a driving mechanism for driving said machining table provided at a center of said machining table; and a guide plate for guiding chips into said chip tray provided under said machining table and for covering said driving mechanism.

10. A laser machining apparatus according to claim 1, further comprising:

a guide for guiding movement of said machining table; and a driving mechanism for driving said machining table;

wherein said guide and driving mechanism are provided in edge sections in said moving direction of said machining table as well as in said direction perpendicular to said moving direction of said machining table.

11. A laser machining method comprising the steps of:

cutting a workpiece mounted on a machining table by executing laser machining;

providing a chip conveyor communicable with a section of said machining table;

conveying a first number of chips generated in said cutting step and dropped from said machining table onto said chip conveyor in a specific direction;

providing a chip tray communicable with said chip conveyor and communicable with said machinery table in a section where said chip conveyor does not exist;

transporting a second number of chips generated in said cutting step and received in said chip tray onto said chip conveyor; and conveying said second number of chips transported in said transporting step in a specific direction.

* * * * *